March 13, 1962 F. CLYNCH 3,024,861
SYSTEM FOR ANCHORING AND TRANSPORTING A SEISMIC VIBRATOR
Filed March 3, 1958 3 Sheets-Sheet 1

INVENTOR.
FRANK CLYNCH
BY Arthur W. Fugok
ATTORNEY

March 13, 1962
F. CLYNCH
3,024,861
SYSTEM FOR ANCHORING AND TRANSPORTING A SEISMIC VIBRATOR
Filed March 3, 1958
3 Sheets-Sheet 2
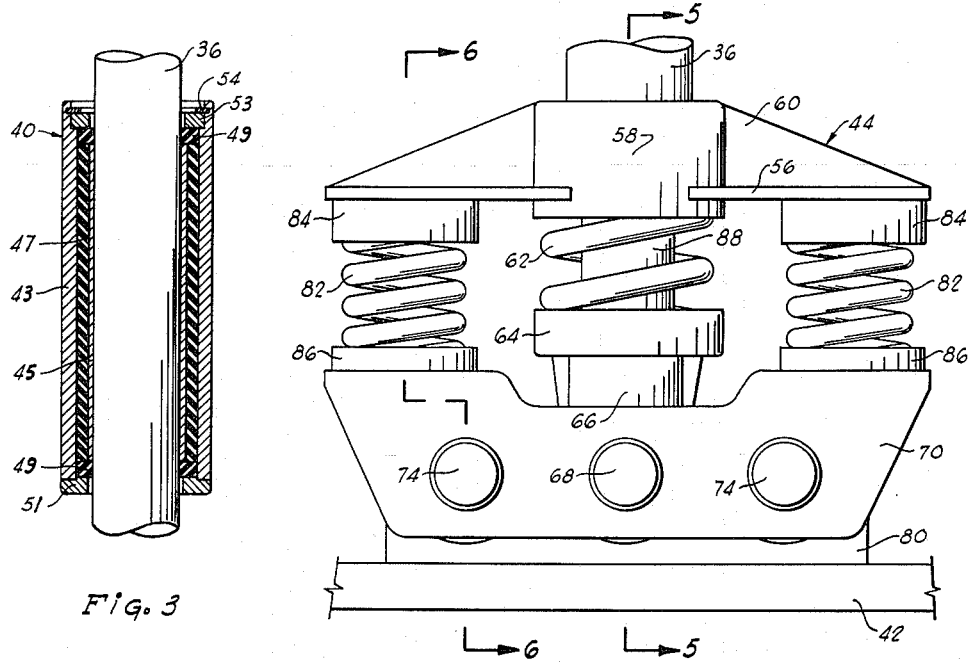
Fig. 3
Fig. 4
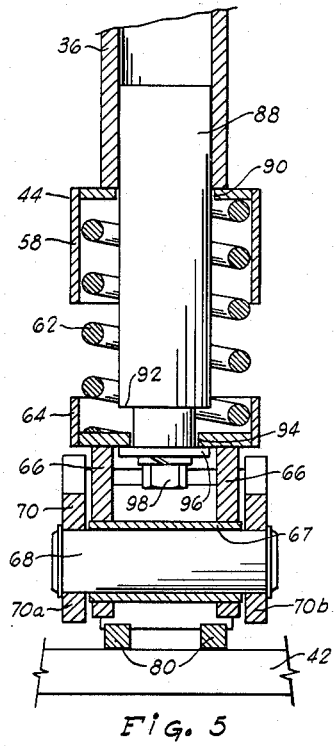
Fig. 5
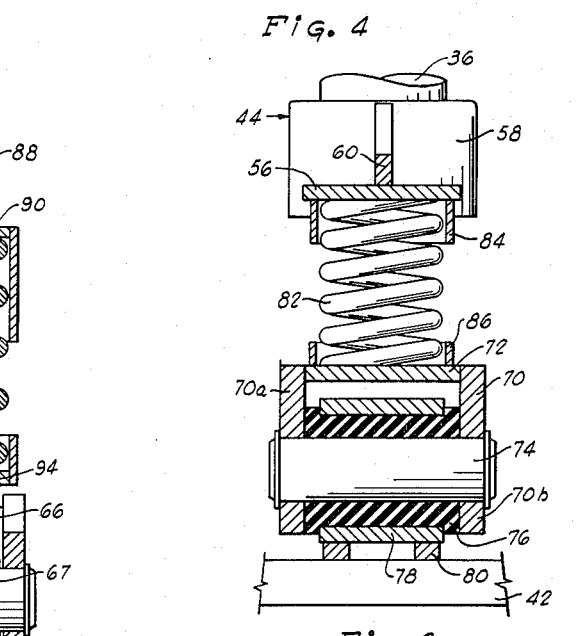
Fig. 6
INVENTOR.
FRANK CLYNCH
BY Arthur W. Fizak
ATTORNEY

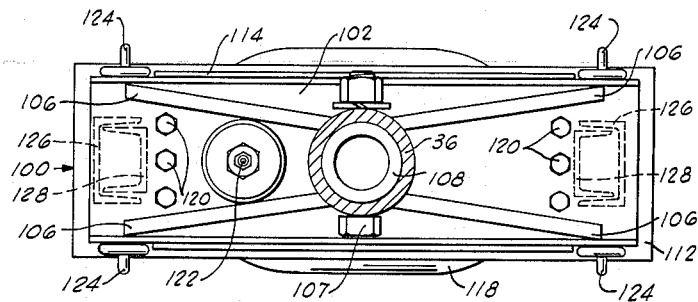
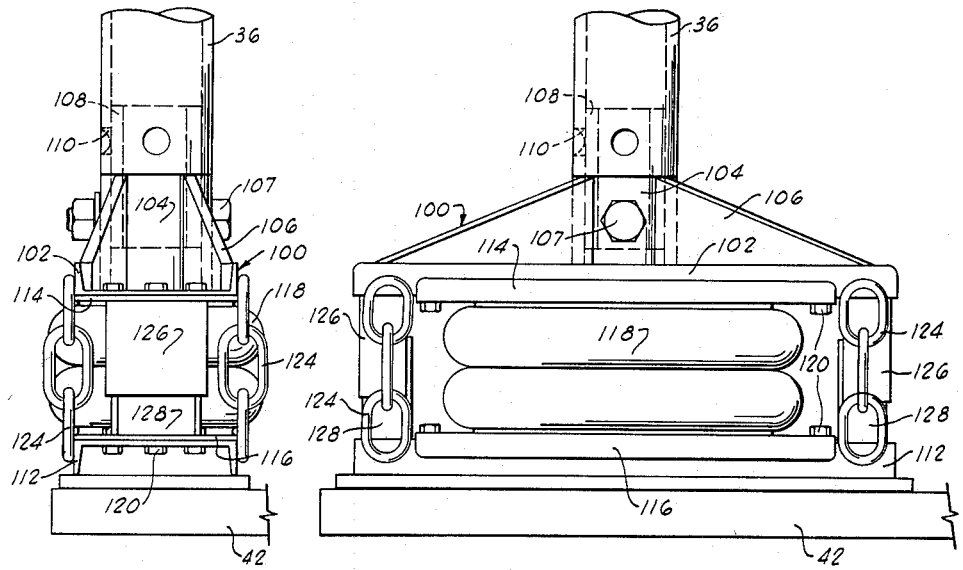

United States Patent Office 3,024,861
Patented Mar. 13, 1962

1

3,024,861
SYSTEM FOR ANCHORING AND TRANSPORTING A SEISMIC VIBRATOR
Frank Clynch, Ponca City, Okla.
Filed Mar. 3, 1958, Ser. No. 718,574
10 Claims. (Cl. 181—.5)

This invention relates generally to improvements in the art of seismic surveying of the type utilizing a vibrating energy source, and more particularly to an improved system for anchoring and, alternately, transporting a seismic vibrator. This is a continuation-in-part of the co-pending application of the present inventor and John M. Crawford entitled, "Method of Coupling a Vibrator to an Elastic Medium," Serial No. 516,288, filed June 17, 1955, which is now issued as Patent No. 2,910,134, granted October 27, 1959.

As disclosed in the above mentioned co-pending application, an efficient method for anchoring a vibrator to the earth is to support a mass on the vibrator having a weight sufficient to maintain the vibrator in constant contact with the earth while the vibrator is in operation. When the mass is supported on the vibrator through an elastic coupling having a compliance such that the natural or resonant frequency of the system is substantially less than or greater than the frequency of oscillation of the vibrator, the mass is maintained substantially motionless during operation of the vibrator, the necessary force output of the vibrator can be minimized, and an efficient transmission of energy is obtained.

The present invention contemplates a system for practicing the method previously disclosed, as well as for transporting a vibrator between vibrating positions. This invention contemplates the mounting of a vibrator on a truck in such a manner that the truck may be used to transport the vibrator, and, when the vibrator is in position, at least a portion of the weight of the truck is imposed on the vibrator to maintain the vibrator in constant contact with the earth during operation. The vibrator is coupled to the truck through an elastic medium which will retain the truck substantially motionless during operation of the vibrator, as well as by a linkage system such that the vibrator may be lifted relative to the truck, yet the linkage will not impair the normal oscillation of the vibrator.

An important object of the present invention is to increase the speed of seismic surveying when using a vibrating energy source.

Another object of this invention is to use the same apparatus for transporting the vibrator as for anchoring the vibrator to the earth.

A further object of this invention is to position a vibrator and couple the vibrator to the earth in a minimum of time.

Another object of this invention is to mount a vibrator on a truck in such a manner that the vibrator may be either lifted relative to the truck, or lowered relative to the truck, and at least a portion of the weight of the truck elastically imposed on the vibrator.

A still further object of this invention is to provide an elastic coupling of a vibrator to a truck, whereby the supporting structure of the vibrator will tilt to conform to the inclination of the earth to which the vibrator is being coupled, and the truck will be maintained substantially motionless during operation of the vibrator.

Another object of this invention is to secure a vibrator to a truck in such a manner that the vibrator supporting structure will be tilted to conform to the inclination of the earth to which the vibrator is coupled during operation of the vibrator, yet the vibrator will have a minimum tendency to swing relative to the truck as it is being transported between vibrating locations.

2

Other objects and advantages of the invention will be evident from the following detailed description, when read in conjunction with the accompanying drawings which illustrate my invention.

In the drawings:

FIGURE 3 is a vertical sectional view through one of the guides used for retaining the anchoring and supporting columns for the vibrator vertically with respect to the truck, and a full view of the column confined within the guide.

FIGURE 4 is an enlarged side elevational view of one form of an elastic coupling device for the vibrator.

FIGURE 5 is a vertical sectional view of the brace member and lower shoe assembly as taken substantially along lines 5—5 of FIG. 4, and a full view of the shaft assembly and pin mated therein.

FIGURE 6 is a vertical sectional view of the brace member and lower shoe assembly as taken substantially along lines 6—6 of FIG. 4, with a full view of the restraining spring and central pin.

FIGURE 7 is a side elevational view of another form of an elastic coupling device for the vibrator.

FIGURE 8 is an end view of the coupling device illustrated in FIG. 7.

FIGURE 9 is a sectional view taken through the vertical column above the coupling device and looking down on the coupling device illustrated in FIGS. 7 and 8.

Figure 1:
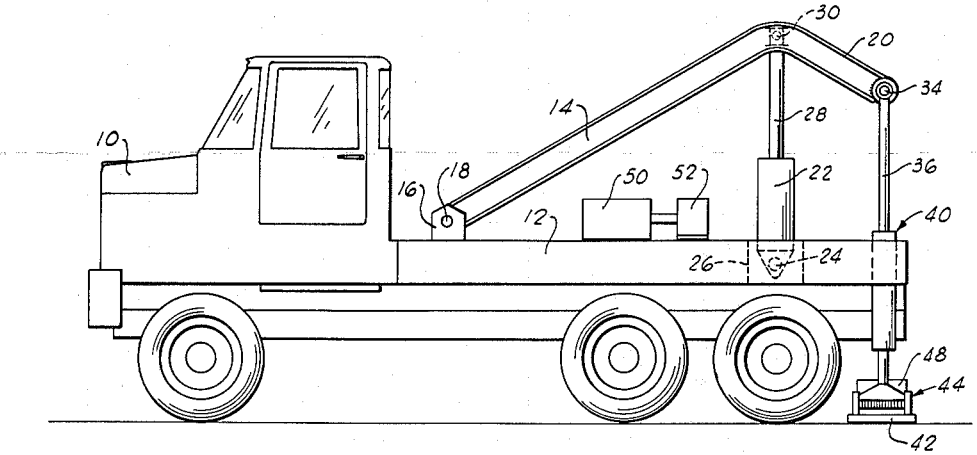
FIGURE 1 is a side elevational view, partially schematic, of a system constructed in accordance with the present invention.
Figure 2:
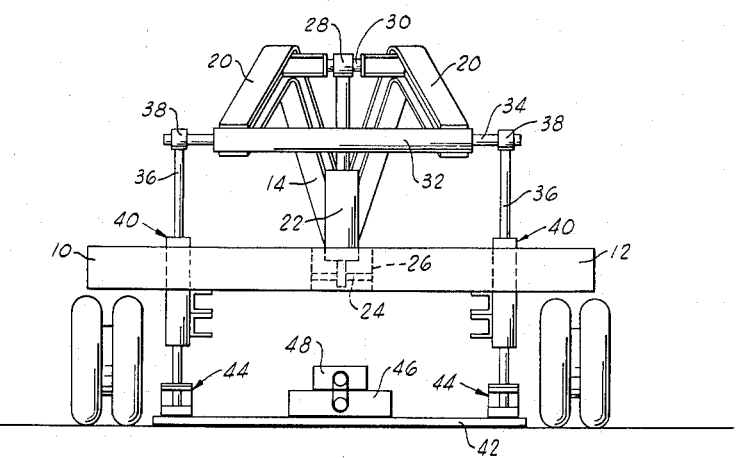
FIGURE 2 is an end elevational view of the system shown in FIG. 1, looking at the rear end of the truck.

Referring to the drawings in detail, and particularly FIGS. 1 and 2, reference character 10 designates a truck of any suitable type which has a substantially flat bed 12. A relatively long beam 14 is pivotally secured to the forward end of the bed 12 by means of a suitable bracket 16 and transversely extending pin 18, such that the beam 14 may be pivoted vertically over the truck bed 12. The beam 14 extends rearwardly over the bed 12 and is separated into diagonally extending arms 20 which terminate slightly forward of the rear end of the truck bed 12.

A suitable hydraulic jack 22 is pivotally secured at its lower end by a cross-pin 24 to the truck bed 12 to pivot in a vertical plane forwardly and rearwardly with respect to the truck 10. The truck bed 12 is cutaway at 26, as shown by dotted lines, to permit the forward and rearward pivotal movement of the jack 22. The telescoping portion 28 of the jack 22 extends upwardly to a point between the arms 20 of the beam 14 and is pivotally secured on a shaft 30 extending between the arms 20. Thus, the beam 14 will be pivoted vertically on the pin 18 upon operation of the hydraulic jack 22. It may also be noted that the jack 22 is of a size to raise and lower the beam 14 with a force at least as great as the weight of the truck 10, as will be more fully hereinafter set forth.

The rear ends of the arms 20 are rigidly secured, as by welding, to a horizontally extending sleeve 32, as is most clearly shown in FIG. 2. The sleeve 32 is slidingly telescoped on a transversely extending shaft 34, with the shaft 34 protruding from the opposite ends of the sleeve 32. A vertical column 36 is secured by a suitable bearing 38 to each end of the shaft 34 and extends downwardly through the rear end portion of the truck bed 12. Each column 36 may be of any desired cross-section, although I prefer to use tubular-shaped columns, since they may be easily formed out of heavy wall pipes. Each column 36 slidingly extends through a guide (generally designated by reference character 40) secured in the truck bed 12, to retain the columns 36 substantially at right angles to the truck bed, as will be more fully hereinafter set forth. The lower end of each column 36 is secured to the respective end portion of a vibrator base plate 42 by means of an elastic coupling device, generally designated by reference character 44. The vibrator 46 is rigidly secured on the central portion of the base plate 42, such that the base plate 42 extends from the opposite sides of the vibrator. The vibrator 46 may be of any suitable type and be driven by any desired mechanism, but I prefer to use a mechanical vibrator driven by a hydraulic motor 48 rigidly mounted on top of the vibrator.

A suitable engine 50 is secured on the truck bed 12, as shown in FIG. 1, and is drivingly connected to a pump 52. It will be understood, however, that the pump 52 could be operated by a power take-off (not shown) from the truck 10 if desired. The pump 52 is suitably connected (not shown) to the jack 22 and the vibrator motor 48 by the necessary valves and conduits to supply hydraulic fluid for operation of both the jack 22 and the motor 48. It will thus be apparent that the jack 22 and the motor 48 may be operated independently from the truck 10. Also, the vibrator 46 may be raised and lowered by the jack 22 and operated by the motor 48 when and as desired, and as will be more fully hereinafter set forth.

Each guide 40 is constructed as shown in FIG. 3 and comprises a rigid sleeve 43 of a length to extend through the truck bed 12. Each sleeve 43 is rigidly secured to the adjacent portion of the truck bed 12 by suitable braces or the like (not shown). A bushing 45 (of a size to slidingly receive the respective column 36 and formed out of a bearing type metal, such as brass) is secured in each rigid sleeve 43 by an elastic sleeve 47 and elastic rings 49 at the upper and lower ends of the elastic sleeve. A suitable apertured cap 51 is rigidly secured on the lower end of each sleeve 43 and extends inwardly a sufficient distance to prevent downward movement of the sleeves 45 and 47 and the rings 49. However, the bore through each cap 51 has a diameter substantially larger than the outer diameter of the respective column 36 to prevent contact between the column 36 and the cap. A metal ring 53 is secured on top of the upper elastic ring 49 by a locking ring 54 to prevent upward movement of the sleeves 45 and 47 and the rings 49 and 53. It will also be noted that the upper ring 53 has an inner diameter substantially larger than the outer diameter of the respective column 36. Thus, the columns 36 may be moved a slight degree off of the vertical, and will still be held by the guide members 40 through the elastic sleeves 47. In this same connection it should be noted that the beam 14 (FIGS. 1 and 2) is ordinarily several feet long, such that the shaft 34 attached to the upper ends of the columns 36 will be moved a very slight distance forwardly and rearwardly with respect to the truck bed 12 when the beam 14 is raised and lowered to raise and lower the vibrator 46. Thus, the columns 36 will be retained substantially vertical at all times. In fact, I prefer to install the guides 40 to slant slightly forward when the truck bed 12 is positioned horizontally, such that the columns 36 will extend vertically when the truck is raised to impose a force on the vibrator base plate 42. The elastic sleeves 47 and the guides 40 also function to minimize transmission of vibrations between the columns 36 and the rear portion of the truck bed 12, as will be described in detail below.

Each coupling device 44 (FIGS. 4–6) comprises an upper elongated shoe 56 having a cylindrical spring housing 58 secured in the central portion thereof by brace members 60. The housing 58 is open at its lower end to receive the upper end portion of a helical compression spring 62. The spring 62 extends downwardly into a cylindrical spring housing 64 rigidly secured on the upper ends of a pair of side plates 66. The side plates 66 are in turn pivotally secured by a sleeve 67 and transversely extending pin 68 to a lower, mating shoe 70. As shown in both FIGS. 5 and 6, the lower shoe 70 is constructed in the form of a pair of parallel plates 70a and 70b substantially the same length as the upper shoe 56, and the plates 70a and 70b are interconnected by horizontally extending plates 72 at the opposite ends thereof. The pin 68 extends through the central portion of the lower shoe 70 to anchor the compression spring 62 to the lower shoe and transmit any force imposed upon the upper end of the compression spring 62 onto the lower shoe 70, as will be more fully hereinafter set forth.

The lower shoe 70 is in turn connected to the respective end portion of the vibrator base plate 42 by pins 74 extending through the opposite end portions of the side plates 70a and 70b. A bushing 76, formed out of an elastic material, such as rubber, is disposed on each of the pins 74 to receive a sleeve 78 which is in turn rigidly secured by bars 80 to the top of the vibrator base plate 42. The bushings 76 tend to minimize the transmission of small vibrations between the vibrator base plate 42 and the lower shoe 70, however, substantial upward or downward forces imposed on the lower shoe 70 will be transmitted to either raise or lower the vibrator base plate 42, and hence the vibrator 46.

Although the springs 62 are the primary means for transmitting the weight of the truck 10 onto the opposite end portions of the vibrator base plate 42, as will be more fully hereinafter described, I also prefer to provide an additional, weaker spring 82 between the adjacent ends of each pair of shoes 56 and 70. The upper end of each spring 82 is anchored in a cylindrical housing 84 rigidly secured on the lower face of the respective upper shoe 56, and the lower end of each spring 82 is anchored in a similar housing 86 rigidly secured on the respective plate 72 of the respective lower shoe 70. The springs 82 tend to stabilize the vibrator 46 during transportation of the vibrator. That is, the springs 82 tend to minimize pivoting of the lower shoes 70 on the central pins 68 and substantially eliminate any tendency of the vibrator and vibrator base plate to swing forwardly and rearwardly with respect to the truck 10 as the speed of the truck is changed during the course of transporting the vibrator 46 from one location to another.

As shown in FIG. 5, a rod or shaft 88 is secured in the lower end portion of each column 36 and extends downwardly through the respective compression spring 62. Each rod 88 may be welded or otherwise rigidly secured in the respective column 36, and the upper end of each of the central spring housings 58 is provided with a centrally located aperture 90 to loosely receive the respective shaft 88. The lower end of each shaft 88 is reduced in diameter to form a downwardly facing shoulder 92 and extend through a smaller aperture 94 provided in the center of the respective lower spring housing 64. A washer 96, having an outer diameter greater than the diameter of the respective bore 94, is secured on the lower end of each rod 88 by a nut 98 to contact the lower end of the respective spring housing 64 and limit the upward movement of the rods 88 through the bores 94. Upon downward movement of the columns 36 and the rods 88, each shoulder 92 moves downwardly toward the lower end of the respective spring housing 64. However, the springs 62 have sufficient strength to support a large portion of the weight of the truck 10 before the shoulders 92 will make contact with the spring housings 64. Thus, the rods 88 form a collapsible linkage between the columns 36 and the lower shoes 70 to lift the vibrator 46 upon upward movement of the columns 36, yet not interfere with downward movement of the columns 36 when a substantial weight is imposed on the columns.

*Operation*

To illustrate the operation of the present system, let it be assumed that the truck 10 has been moved to the desired vibrating location, and the jack 22 has been retracted to lower the beam 14 and the columns 36 to such an extent that the vibrator base plate 42 is in contact with the earth. The vibrator 46 will not be operating at this time. Upon operation of the engine 50 and pump 52, and the valving between the pump 52 to the jack 22, the jack 22 is further retracted to impose the weight of the rear portion of the truck 10 onto the beam 14 through the jack member 28 and the shaft 30 extending between the arms 20 of the beam 14. This force is in turn transmitted through the sleeve 32 (FIG. 2), the shaft 34 and the bearings 38 to the upper ends of the vertical columns 36. As previously described, the columns 36 will be moved slightly off of the vertical as the beam 14 is moved upwardly or downwardly with respect to the truck 10. However, this forward or rearward movement of the columns 36 will be minor and will not bind the columns 36 in the guides 40.

The force transmitted through the columns 36 is in turn imposed on the upper ends of the central spring housings 58 of the upper shoes 56. The springs 62 are thereby compressed against the lower spring housings 64 and the lower shoes 70 to impose the weight of the rear portion of the truck 10 onto the vibrator base plate 42. When the jack 22 has been retracted to an extent to raise the rear wheels of the truck 10 off of the ground and impose the desired portion of the weight of the truck 10 onto the vibrator base plate 42, the jack 22 is shut off from the pump 52 and held in the desired retracted position.

The controls connecting the pump 52 to the vibrator motor 48 are then operated to provide operation of the motor 48 and the vibrator 46. The vibrator 46, as previously indicated, may be of any desired type which, during operation, imposes alternating upward and downward forces on the base plate 42 to generate seismic waves in the earth. This force output of the vibrator 46 will, of course, depend upon the amount of energy it is desired to transmit into the earth. In a typical seismic vibrator, these forces will approach seven tons. It will thus be apparent that a substantial downward force must be imposed on the base plate 42 to prevent the vibrator 46 from jumping off of the ground. In a typical installation, the truck 10 is tilted until a force of from fourteen to sixteen thousand pounds is imposed on the vibrator base plate 42.

During operation of the vibrator 46, the vibrator base plate 42, and hence the lower shoes 70, are moved up and down with the surface of the earth in accordance with the frequency of oscillation of the vibrator 46. This vertical movement of the lower shoes 70 will tend to compress and extend the springs 62, thereby tending to oscillate the vertical columns 36 and the truck 10. However, when the compliance of the springs 62 is such that the natural frequency of the system is substantially different from the frequency of oscillation of the vibrator 46, the springs 62 dampened the vertical movement of the columns 36, and the truck 10 is retained substantially motionless. As proven mathematically in the above-mentioned co-pending application, the truck will not move any appreciable extent when the resonant frequency of the system is either substantially higher than or substantially lower than the frequency of operation of the vibrator. The springs 62 must, of course, be of a strength to support a substantial portion of the weight of the truck 10 with only a minor deflection. It may also be noted that vibrators of the type used in seismic work are ordinarily multi-frequency vibrators and designed to operate over a rather substantial frequency range, as from one to one hundred cycles per sec. However, this frequency range may be easily taken into account in the design of the springs 62.

When the desired operation of the vibrator 46 has been completed, the motor 48 is shut-off from the pump 52, and the pump is in turn connected to the jack 22 to extend the jack and raise the beam 14. The upward movement of the beam 14 is transmitted through the vertical columns 36 to raise the rods 88 through the apertures 94 in the respective spring housings 64. When the washers 96 contact the lower ends of the respective spring housings 64, the upward force on the columns 36 will be transmitted to the lower shoes 70 to lift the vibrator base plate 42, along with the vibrator 46 and motor 48. When the vibrator base plate 42 has been raised to the desired height for movement over the ground, the jack 22 is locked in position and the truck 10 is driven to the next vibrating location. During this transportation of the vibrator 46, the guides 40 will prevent pivoting of the columns 36 on the shaft 34. However, the vibrator will tend to swing forwardly and rearwardly on the central pins 68 of the lower shoes 70. The springs 82 will minimize this swinging movement and tend to retain the vibrator 46 in a substantially level position during movement. As previously indicated, the springs 82 also function to assist the springs 62 in the transmission of force from the columns 36 to the lower shoes 70, particularly when the vibrator base plate 42 is inclined to conform to a slanted portion of the surface of the earth.

Referring again to the operation of the vibrator 46, it will be apparent that the earth in the vicinity of the vibrator 46, including that portion of the earth on which the front wheels of the truck 10 are resting, will also be vibrated. However, the frequency of vibration of the surface of the earth away from the vibrator base plate 42 will not be in exact synchronism with the frequency of the vibrator. Thus, the truck 10 will be vibrated at least to a small degree at a frequency different from the frequency of the vibrator 46, and any vibration of the truck 10 will tend to be transmitted through the truck bed 12 and guides 40, as well as through the lever 14 and columns 36. The elastic sleeves 47 in the guides 40 will dampen the transmission of vibrations from the truck bed 12 to the central portions of the columns 36. The pivotal connection of the beam 14 to the truck bed 12 will also tend to dampen transmission of vibrations from the truck to the beam 14 and the upper ends of the columns 36. Thus, the only appreciable vibrating forces imposed on the vibrator base plate 42 will be derived directly from the vibrator 46, such that the seismic waves generated in the earth directly below the base plate 42 will be truly representative of the frequency output of the vibrator 46 and the interpolation of the resulting seismic records will be facilitated.

The lower end of each column 36 may also be connected to the respective end portion of the vibrator base plate 42 by a modified coupling device generally designated by reference character 100 and shown in detail in FIGS. 7, 8 and 9. The coupling device 100 comprises an upper elongated shoe 102 having a tubular member 104 connected to the central portion thereof and extending upwardly from the shoe. The member 104 is secured to the shoe 102 by spaced bracing members 106 to effectively transmit a force imposed on the tubular member 104 to the top of the shoe 102. The member 104 is secured by a bolt 107 on a short tubular member 108 shown in dotted lines in FIGS. 7 and 8 and in full lines in FIG. 9. The member 108 is secured in the lower end of the respective column 36 by welding 110 to couple the upper shoe 102 to the respective column 36.

A lower shoe 112 is rigidly secured on the respective end of the vibrator base plate 42 directly below the respective upper shoe 102. The mating shoes 102 and 112 are of preferably the same length and may conveniently be in the form of channel shaped members to receive the upper and lower plates 114 and 116, respectively, of an air spring 118. The air spring 118 is formed out of an elastic material, such as rubber, and filled with air to form a spring. The upper and lower ends of the inflatable portion of the spring 118 are bonded to the plates 114 and 116 to form an air tight elastic body. The plates 114 and 116 are in turn secured by bolts 120 to the upper and lower shoes 102 and 112. Also, the air spring 118 is provided with an inlet valve 122 extending through the upper plate 114, as shown in FIG. 9, to inflate and deflate the member 118. The air spring 118 may be of any desired design, such as the type presently manufactured by the General Tire and Rubber Company of Akron, Ohio.

As will be apparent, the air springs 118 perform the same function as the compression springs 62 of the coupling devices 44 to transmit the weight of the truck 10 from the columns 36 to the opposite end portions of the vibrator base plate 42 and anchor the vibrator base plate 42 to the earth. The springs 118 may be inflated at various pressures to control the compliance thereof. This compliance, as before, must be such that the natural frequency of the system is substantially greater or substantially smaller than the frequency of oscillation of the vibrator 46.

A chain 124 is secured between the mating corners of each pair of shoes 102 and 112 to lift the vibrator base plate 42, and hence the vibrator 46 and motor 48 upon upward movement of the columns 36. The chains 124 will collapse upon downward movement of the column 36, such that the force being transmitted from the respective column 36 to the plate 42 will be solely through the air spring 118. However, the chains 124 prevent an excessive parting movement of the shoes 102 and 112 when the columns 36 are lifted to raise the vibrator 46. The chains 124 prevent an excessive tensile force being imposed on the air springs 118 which would likely damage the springs. Thus, the chains 124 function as collapsible linkages between the mating shoes in substantially the same manner as the rod 88 and lower spring housing 64 in the coupling device 44.

Depending channel members 126 are secured to the opposite ends of each of the upper shoes 102 to slidingly receive smaller channel members 128 secured on the adjacent ends of the lower shoes 112. As shown by dotted lines in FIG. 9, an appreciable clearance is provided between each pair of cooperating channel members 126 and 128, such that the lower shoe 112 may be disposed at an angle with respect to the upper shoe 102, as when the vibrator base plate 42 must be tilted to conform to the inclination of the surface of the earth. However, the cooperating channels 126 and 128 minimize any appreciable lateral movement of the shoes 112 with respect to the shoes 102, such that the vibrator 46 will not swing to any appreciable extent when the vibrator is being transported from one location to another. The clearance between the channel members 126 and 128 also minimizes the possibility of the channel members getting into a bind during operation of the vibrator 46 to interfere with the operation of the air spring 118.

From the foregoing it will be apparent that the present system will materially speed up seismic surveying operations utilizing a vibrating energy source. The vibrator may be moved from one location to another in a minimum of time and by using a single transporting vehicle. When operating the vibrator, the weight of the vehicle is imposed on the vibrator to efficiently couple the vibrator to the surface of the earth, yet the vibrator may be operated with maximum efficiency. The same apparatus used for transporting the vibrator is also used for anchoring the vibrator to the earth, and the vibrator will not be damaged during transportation by inadvertently swinging and contacting other objects, or the truck, when being moved along the highway.

Changes may be made in the combination and arrangement of parts or elements as heretofore set forth in the specification and shown in the drawings, it being understood that changes may be made in the precise embodiments shown without departing from the spirit and scope of the invention as defined in the following claims.

I claim:

1. In combination with a multi-frequency vibrator and a truck; a base plate rigidly secured to the vibrator and extending outwardly from opposite sides of the vibrator, a pair of columns slidingly secured to the truck in positions to extend substantially vertically on opposite sides of the vibrator, a jack connected to the truck and the columns for raising and lowering the columns relative to the truck and for raising and lowering one end of the truck with respect to said columns, a collapsible linkage secured to the lower end of each column and the base plate on the respective side of the vibrator to lift the vibrator upon upward movement of the columns, and spring means secured to the lower end of each column and the base plate on the respective side of the vibrator for resiliently transmitting the weight of the truck onto the base plate when one end of the truck is raised with respect to the columns, said spring means having a compliance such that the resonant frequency of the system is substantially different from the frequency of vibration of the vibrator.

2. The combination defined in claim 1 characterized further to include a shoe rigidly secured to the lower end of each column, a mating shoe rigidly secured on the base plate on the respective side of the vibrator below each column, and said spring means comprises an air spring secured between each pair of mating shoes.

3. The combination defined in claim 1 characterized further to include a shoe carried on the lower end of each column, a mating shoe secured on the base plate on the respective side of the vibrator below each column, and said spring means comprises a metal spring anchored between each pair of mating shoes.

4. The combination defined in claim 1 characterized further to include an elongated shoe carried on the lower end of each column, a mating shoe secured on the base plate on the respective side of the vibrator below each column, and said spring means comprises a helical compression spring anchored between the central portions of each pair of mating shoes, and weaker helical springs anchored between adjacent end portions of each pair of shoes to stabilize the vibrator.

5. In combination with a multi-frequency vibrator and a truck; a base plate rigidly secured to the vibrator and extending outwardly from opposite sides of the vibrator, a pair of rigid sleeves rigidly secured in vertical positions at the rear portion of the truck, a pair of columns loosely and slidably positioned within the rigid sleeves, a bushing in each rigid sleeve providing a bearing for the respective column, an elastic sleeve between the outer periphery of each bushing and the inner periphery of each rigid sleeve elastically securing the bushing in the rigid sleeve, a jack connected to the truck and the columns for raising and lowering the columns with respect to the truck and for raising and lowering one end of the truck with respect to the columns, collapsible linkages secured to the lower ends of each column and to the base plate on opposite sides of the vibrator to lift the vibrator upon upward movement of the columns, and spring means secured to the lower ends of each column and to the base plate at opposite sides of the vibrator to transmit resiliently the weight of the truck onto the base plate when one end of the truck is raised with respect to said columns, said spring means having a compliance such that the resonant frequency of the system is substantially different from the frequency of vibration of the vibrator.

6. In combination with a multi-frequency vibrator and a truck; a base plate rigidly secured to the vibrator and extending outwardly from opposite sides of the vibrator, a pair of columns slidably secured to the truck in positions to extend substantially vertically on opposite sides of the vibrator, a jack connected to the truck and the columns for raising and lowering the columns with respect to the truck and for raising and lowering the truck with respect to the columns, a shoe rigidly secured to the lower end of each column, mating shoes rigidly secured on the base plate on opposite sides of the vibrator and below each column, a collapsible linkage comprised of a plurality of chains connecting opposed portions of the respective mating shoes and adapted to lift the vibrator upon upward movement of the columns, air springs anchored between respective mating shoes on the columns and base plate to transmit the weight of the truck onto the base plate when one end of the truck is raised with respect to said columns, said air springs having a compliance such that the resonant frequency of the system is substantially different from the frequency of vibration of the vibrator.

7. The combination as defined by claim 6 which is characterized further in that telescoping guides are secured to the corresponding ends of each pair of mating shoes to minimize relative lateral movement between the vibrator and truck.

8. In combination with a multi-frequency vibrator and a truck; a base plate rigidly secured to the vibrator and extending outwardly from opposite sides of the vibrator, a pair of columns slidably secured to the truck in positions to extend substantially vertically on opposite sides of the vibrator, a jack connected to the truck and the columns for raising and lowering the columns with respect to the truck and for raising and lowering the truck with respect to the columns, an elongated shoe rigidly secured to the lower end of each column, mating shoes rigidly secured to the base plate on opposite sides of the vibrator and below each column, spring means comprising a helical compression spring anchored between the central portions of each pair of mating shoes, a plate rigidly secured to each of the shoes on the base plate, said plates having an aperture therein aligned with the center of the centrally located compression spring, a rod rigidly secured to each column and extending downwardly through the centrally located spring and said aperture, said rod having a head thereon below the aperture in the plate for contacting said plate upon upward movement of the columns, weaker helical springs anchored between adjacent end portions of each pair of shoes to stabilize the vibrator during transit, said springs having a compliance such that the resonant frequency of the system is substantially different from the frequency of vibration of the vibrator.

9. In combination with a multifrequency vibrator and a truck; column means having an upper and lower end, means slidably securing said column means to the truck to permit vertical movement of said column means; jack means secured to said truck and operatively connected to the upper end of said column means for raising and lowering the column means relative to said truck, and for raising and lowering one end of the truck with respect to said column means, collapsible linkage means connected between the lower end of said column means and the vibrator whereby said vibrator may be lifted upon upward movement of said column means, said linkage means being collapsible upon downward movement of the column means; and spring means connected between said column means and said vibrator and adapted to resiliently transmit the weight of the truck onto the vibrator when said column means is lowered, said spring means having a compliance such that the resonant frequency of the system is substantially different from any frequency transmitted from said vibrator.

10. In combination with a multifrequency vibrator and a truck; anchor means rigidly secured on opposite sides of the vibrator, vertically extending column means having an upper and lower end, means slidably securing said vertically extending column means to said truck above the anchor means on each side of said vibrator; collapsible linkage means connecting the lower end of said column means to the corresponding anchor means therebelow; jack means secured to said truck and operably connected to said vertically extending column means, said jack means adapted to raise and lower one end of said truck with respect to said column means; and spring means secured to said column means and to its corresponding anchor means for resiliently transmitting the weight of the truck onto the vibrator, said spring means having a compliance such that the resonant frequency of the system is substantially different from the frequency transmitted from said vibrator.

References Cited in the file of this patent
UNITED STATES PATENTS

| | | |
|---|---|---|
| 1,107,976 | McCoy | Aug. 18, 1914 |
| 2,633,781 | Day | Apr. 7, 1953 |
| 2,723,608 | Jackson | Nov. 15, 1955 |